United States Patent
Lee (10) Patent No.: US 10,097,476 B2
(45) Date of Patent: Oct. 9, 2018

(54) METHOD AND APPARATUS FOR CONTROLLING HOME NETWORK ACCESS USING PHONE NUMBERS, AND SYSTEM THEREOF

(71) Applicant: KT Corporation, Seongnam-si (KR)

(72) Inventor: Mi-Ae Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 253 days.

(21) Appl. No.: 14/681,567

(22) Filed: Apr. 8, 2015

(65) Prior Publication Data

US 2015/0215233 A1      Jul. 30, 2015

Related U.S. Application Data

(63) Continuation of application No. 13/323,321, filed on Dec. 12, 2011, now Pat. No. 9,032,074.

(30) Foreign Application Priority Data

Dec. 10, 2010  (KR) .................... 10-2010-0126183

(51) Int. Cl.
  *H04L 12/911*  (2013.01)
  *H04L 29/12*  (2006.01)
  *H04L 12/28*  (2006.01)
  *H04L 29/06*  (2006.01)

(52) U.S. Cl.
  CPC .......... *H04L 47/70* (2013.01); *H04L 12/2834* (2013.01); *H04L 61/605* (2013.01); *H04L 63/101* (2013.01)

(58) Field of Classification Search
  None
  See application file for complete search history.

(56) References Cited

U.S. PATENT DOCUMENTS

| | | | |
|---|---|---|---|
| 2003/0027565 A1* | 2/2003 | Bossemeyer, Jr. .................... | H04L 12/6418 455/422.1 |
| 2005/0160477 A1* | 7/2005 | Saito ................... | H04L 12/2805 726/12 |
| 2009/0086688 A1* | 4/2009 | Kvache ............... | H04L 12/2809 370/338 |
| 2010/0099382 A1* | 4/2010 | Ishiguro .............. | H04L 12/2834 455/411 |

(Continued)

*Primary Examiner* — Philip Chea
*Assistant Examiner* — Hassan Khan
(74) *Attorney, Agent, or Firm* — Sughrue Mion, PLLC (57) ABSTRACT

A method and apparatus for controlling a home network access using phone numbers, and a system thereof, which enables a sharing user to simply set and manage sharing environment based on a telephone number capable of being easily recognized by the sharing user, and enables sharing users to simply access a sharing device inside a home using telephone numbers previously recognized by the sharing users when sharing contents of a UPnP device connected to a home network with the sharing users outside the home. The system includes a phone number management server for managing phone number information and a linked home gateway identifier, an access list management server for managing an access list, a home gateway management server for managing state information and access information of a home gateway, and a service server for receiving a service request from a remoter terminal and processing the received service request.

7 Claims, 3 Drawing Sheets

(56) References Cited

U.S. PATENT DOCUMENTS

2015/0106955 A1\* 4/2015 Soelberg ............. G06F 21/6245
726/27

\* cited by examiner

METHOD AND APPARATUS FOR CONTROLLING HOME NETWORK ACCESS USING PHONE NUMBERS, AND SYSTEM THEREOF

CROSS-REFERENCE(S) TO RELATED APPLICATIONS

The present application is a Continuation of U.S. application Ser. No. 13/323,321, filed Dec. 12, 2011, which claims priority under 35 U.S.C. § 119(a) from Korean Patent Application No. 10-2010-0126183, filed on Dec. 10, 2010, in the Korean Intellectual Property Office, the disclosures of which are incorporated herein by reference in their entireties.

BACKGROUND

1. Field

Methods and apparatuses consistent with the exemplary embodiments relate to a method and apparatus for controlling a home network access using phone numbers, and a system thereof, which enable sharing users (remote users) to access a shared device inside a home using telephone numbers previously recognized by the sharing users when contents (home contents) of a universal plug and play (UPnP) device located inside the home are shared with the sharing users outside the home; and, more particularly, to a method and apparatus for controlling a home network access using phone numbers, and a system thereof, which enables a sharing user to set and manage information on a home gateway to be accessed by the sharing user and an access list (i.e., sharing user list) to allow access to the home based on a telephone number, and enables sharing users outside a home to simply access a shared device inside the home based on telephone numbers recognized by the sharing users so that the sharing users can use contents of UPnP devices connected to a home network outside the home.

Although it is described in the following exemplary embodiments that content sharing in a home network is extended to the outside of a home so that remote users located outside the home can easily use home contents, the scope of the application is not limited thereto.

2. Description of Related Art

Universal plug and play (UPnP) technology is used to perform mutual communication between various devices connected to a home network. In devices having a UPnP protocol applied thereto, it is possible to find devices connected to the home network and to use services and contents provided from the corresponding devices.

Studies have been conducted to develop various methods for extending content sharing in a home network to outside the home, so that remote users located outside the home can use contents of the home network, but any remarkable result has not yet been obtained.

Meanwhile, various types of communication terminals are provided, including a general wired phone terminal, an Internet phone linked with the Internet, a mobile phone linked with a mobile communication network and wired/wireless Internet network, etc., and telephone numbers are provided to the communication terminals, respectively. Accordingly, it is possible to distinguish information on the communication terminal and home of an individual user. In the communication terminals, information of other people are divided and managed based on telephone numbers, and information on the telephone numbers may be shared and managed between various terminals in the home network.

Therefore, it is urgently required to provide a scheme for enabling remote users to access a shared device inside a home using telephone numbers previously recognized by the remote users so that the remote users located outside of the home can easily use home contents by extending content sharing in a home network to outside the home.

SUMMARY

One or more exemplary embodiments relate to a method and apparatus for controlling a home network access using phone numbers, and a system thereof, which enables a remote user to simply set and manage a shared environment based on a telephone number capable of being easily recognized by the remote user, and enables remote users to simply access a shared device inside a home using telephone numbers previously recognized by the remote users when contents of a UPnP device connected to a home network are shared with the remote users outside the home.

Other objects and advantages of the exemplary embodiments can be understood by the following description, and become apparent with reference to the exemplary embodiments. Also, it is obvious to those skilled in the art to which the exemplary embodiments pertain that the objects and advantages of the exemplary embodiments can be realized by the means as claimed and combinations thereof.

According to an aspect of an exemplary embodiment, there is provided a system for controlling a home network access, the system including: a phone number management server configured to manage phone number information, the phone number information comprising a telephone number, and a home gateway identifier of a home gateway associated with the telephone number; an access list management server configured to manage an access list that identifies the telephone number as a permitted telephone number by which the home network may be accessed through the home gateway; a home gateway management server configured to manage state information of the home gateway and access information of a home gateway; and a service server configured to receive a service request from a remote terminal to access the home network, the service request comprising the telephone number, and process the received service request.

The system may further include a phone subscription management server configured to register the telephone number and home gateway identifier in the phone number management server, based on telephone number and customer information registered in application of a wired phone subscription.

The home gateway may be configured to manage home terminal information, update the access list in the access list management server, update the state information and the access information in the home gateway management server, and receive an access request from the remote terminal so as to route the received access request to a home terminal on the home network.

According to an aspect of another exemplary embodiment, there is provided an apparatus for controlling a home network access, the apparatus including: a home gateway information renewal unit configured to update state information and access information in a home gateway management server; an access list management unit configured to receive a request of addition or deletion of a phone number permitted to remotely access the home network and updates an access list in an access list management server based on the received request; a device information management unit configured to register and manage device information on a home terminal; an access control unit configured to determine whether to permit access to the home network by a remote terminal through the access list management unit based on authentication information and control connection of the remote terminal, according to an access request of the remote terminal; and a device information transmission unit configured to search the device information management unit for the device information of a home terminal and transmit the searched device information to the remote terminal, according to the access request of the remote terminal.

According to an aspect of another exemplary embodiment, there is provided a method for controlling a home network access, the method including: receiving from a remote terminal a connection request to access the home network, the connection request comprising a phone number; inquiring whether the telephone number is a permitted telephone number by which the home network may be accessed to an access list management server using the phone number and receiving from the access list management server a reply that indicates the phone number is permitted to access the home network; extracting a home gateway identifier associated with the phone number through a phone number management server; inquiring a home gateway management server of information a home gateway to be connected, based on the extracted home gateway identifier, and receiving from the home gateway management server the information of the home gateway; and transmitting the information of the home gateway and authentication information to the remote terminal.

According to an aspect of another exemplary embodiment, there is provided a method for controlling a home network access, the method including: updating state information and access information of a home gateway in a home gateway management server; receiving a request of addition or deletion of a phone number permitted to remotely access the home network so as to update an access list in an access list management server; registering and managing device information on a home terminal; determining whether to permit access to the home network by a remote terminal through the access list management server based on authentication information, according to an access request of the remote terminal; searching a device information management unit for the device information of a home terminal and transmitting the searched device information to the remote terminal, according to a result of determining whether to permit the access request of the remote terminal; and controlling connection of the remote terminal to the home terminal.

BRIEF DESCRIPTION OF THE DRAWINGS

The above and other aspects of the exemplary embodiments will become more apparent by describing in detail exemplary embodiments thereof with reference to the attached drawings in which.

DESCRIPTION OF EXEMPLARY EMBODIMENTS

Exemplary embodiments will be described below in more detail with reference to the accompanying drawings. The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness. Throughout the disclosure, like reference numerals refer to like parts throughout the various figures and exemplary embodiments.

Throughout the disclosure, when one element (or component) is referred to as being 'connected' to another element (or component), it should be understood that the former can be 'directly connected' to the latter, or 'electrically connected' to the latter through an intervening element (or component). Also, when it is described that one comprises (or includes or has) some elements, it should be understood that it may comprise (or include or have) other elements as well as those elements unless otherwise specified.

Figure 1:
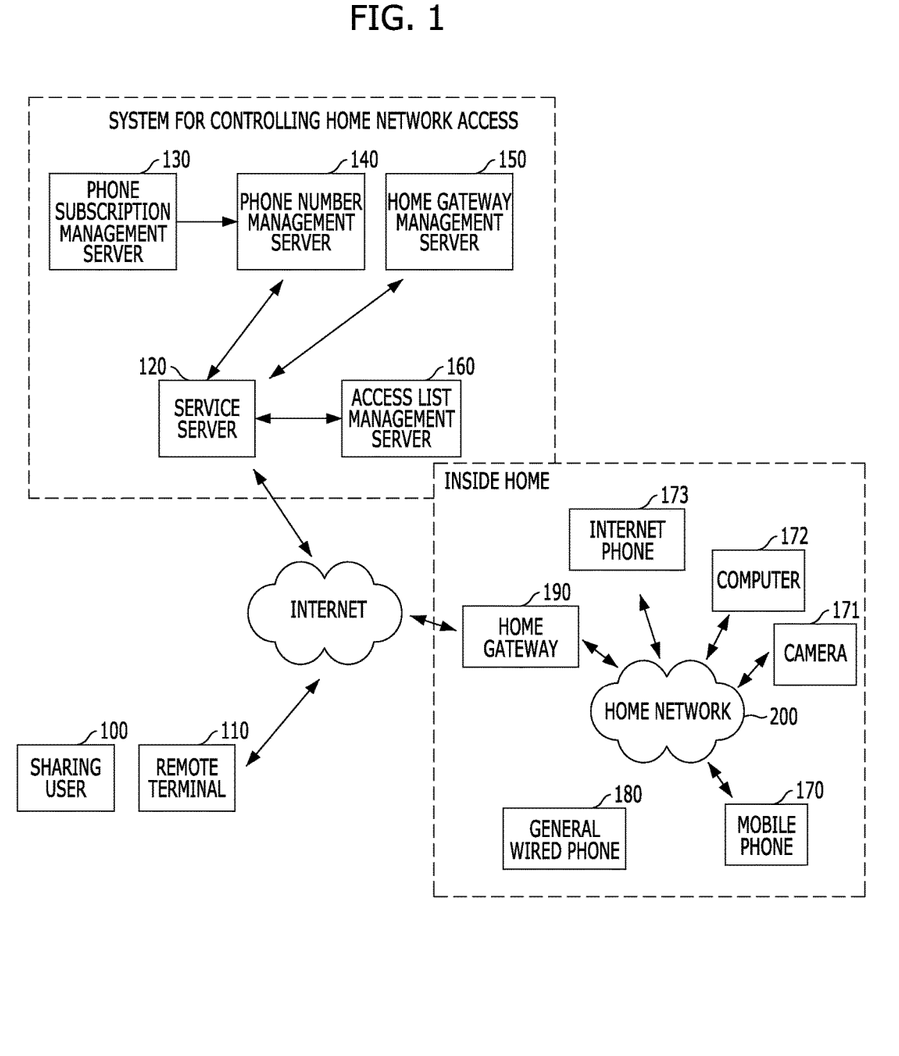
FIG. 1 illustrates a system for controlling a home network access using phone numbers according to an exemplary embodiment.

FIG. 1 illustrates a system for controlling a home network access using phone numbers according to an exemplary embodiment.

Here, the system manages information on a home gateway to which devices are to be connected, an access list, etc., based on a telephone number capable of being easily recognized by a remote user so that the remote user outside the home can use contents of UPnP devices (home terminals) located in a home network.

As illustrated in FIG. 1, the system according to the exemplary embodiment includes a service server 120, a phone subscription management server 130, a phone number management server 140, a home gateway management server 150, and an access list management server 160. The phone number management server 140 manages a phone number list for each user, phone number information, such as a type for each phone number, and a linked home gateway identifier. The access list management server 160 manages an access list for each phone number. The home gateway management server 150 manages state information (e.g., the presence of on-line state) of a home gateway 190 and access information (e.g., access IP address information) of the home gateway 190. The service server 120 receives and processes a service request from a sharing user at a remote place. Although depicted separately, it will be understood by the skilled artisan that the servers 120-160 may be configured as a single server that performs the functions of each of the servers 120-160.

The phone subscription management server 130 registers phone number information and a linked home gateway identifier of a corresponding home in the phone number management server 140 based on phone number and customer information registered when a user applies for subscription of a wired phone. That is, the phone subscription management server 130 is implemented using an existing server for registering and managing phone subscription statements.

The system further includes a home gateway 190 inside the home. The home gateway 190 manages information on a home terminal, and receives an access list for the home terminal, and then updates the received access list in the access list management server 160. The home gateway 190 receives an access request from a remote user 100 of a remote terminal 110 at a remote location outside the home and routes the received accessed request to the corresponding home terminal.

The home terminal may be one or more home terminals 171 to 173, such as a camera, a computer, an Internet phone, etc. Each of the home terminals 171 to 173 provides contents stored in its own memory based on UPnP, and requests the home gateway 190 to set an access list (registration/deletion of a home access phone number) based on a phone number list stored in its own memory when storing the corresponding phone number list. The remote terminal 110 obtains contents stored in the home terminals 171 to 173 by accessing the home terminals 170 to 173 through the service server 120 and the home gateway 190 using a phone number.

In this case, the home gateway 190 is located at a place through which a terminal is connected to a home network 200 inside the home, and an Internet phone 173, a mobile phone 170, a computer 172, a camera 171 and various other UPnP devices (home terminals) are located at the home network 200. The service server 120, the phone subscription management server 130, the phone number management server 140, the access list management server 160, and the home gateway management server 150 are located outside the home. The remote terminal 110 is also remotely located outside the home, and may connect to the servers 120 to 160 and the home gateway 190 over a network, such as the Internet.

Meanwhile, the phone number management server 140 is a server that manages a phone number list for each user, a type of each phone number, and a linked home gateway identifier. In the case of a general wired phone terminal 180 not connected to the home network 200, the phone number management server 140 automatically receives phone number information and a linked home gateway identifier of the corresponding home from the phone subscription management server 130 based on subscription information in completion of phone subscription, and registers and manages the phone number information and linked home gateway identifier. In the case of the Internet phone 173 and the mobile phone 170, connected to the home network 200, the phone number management server 140 receives phone number information and a linked home gateway identifier of the corresponding home, extracted by the home gateway 190 at the time when the corresponding home terminal is connected to the home network 200, and registers and manages the phone number information and linked home gateway identifier.

The access list management server 160 is a server that manages an accessible phone number list (access list) for each phone number. The access list management server 160 receives the presence of accessibility of a user having a phone number (i.e., registration/deletion of the phone number accessible to the home) through the home terminal 170 or 173 having the corresponding phone number among the home terminals 170 to 173 connected to the home network 200 so as to manage the received the presence of the accessibility of the user.

The home gateway management server 150 is linked with the home gateway 190 so as to periodically update and manage the presence of on-line state of the home gateway 190, access Internet protocol (IP) address information, etc.

The home gateway 190 is located at the place through which a terminal is connected to a home network 200 inside the home. The home gateway 190 identifies the presence of connection of a terminal to the home network 200 and updates phone number information and a linked home gateway identifier of the corresponding terminal in the phone number management server 140. The home gateway 190 receives a list (access list) to allow an access to the home through a home terminal having a telephone number so as to update the received list in the access list management server 160. The home gateway 190 registers and manages UPnP devices (home terminals) in the home network 200, and collects UPnP device information (home terminal information) and then provides the collected information to the remote terminal 110. The home gateway 190 routes, to a UPnP device (home terminal), a request of access to the corresponding home terminal received from the remote terminal 110.

When an unregistered mobile phone is connected to the home network, the home gateway 190 determines whether the mobile phone is a terminal of the corresponding home. That is, in the case of the unregistered mobile phone, the home gateway 190 determines the mobile phone as a guest terminal, and registers phone number information and a linked home gateway identifier of the corresponding terminal in the phone number management server 140. When receiving a request to access the guest terminal from the remote terminal 110, the home gateway 190 routes the received access request to the guest terminal.

Figure 2:
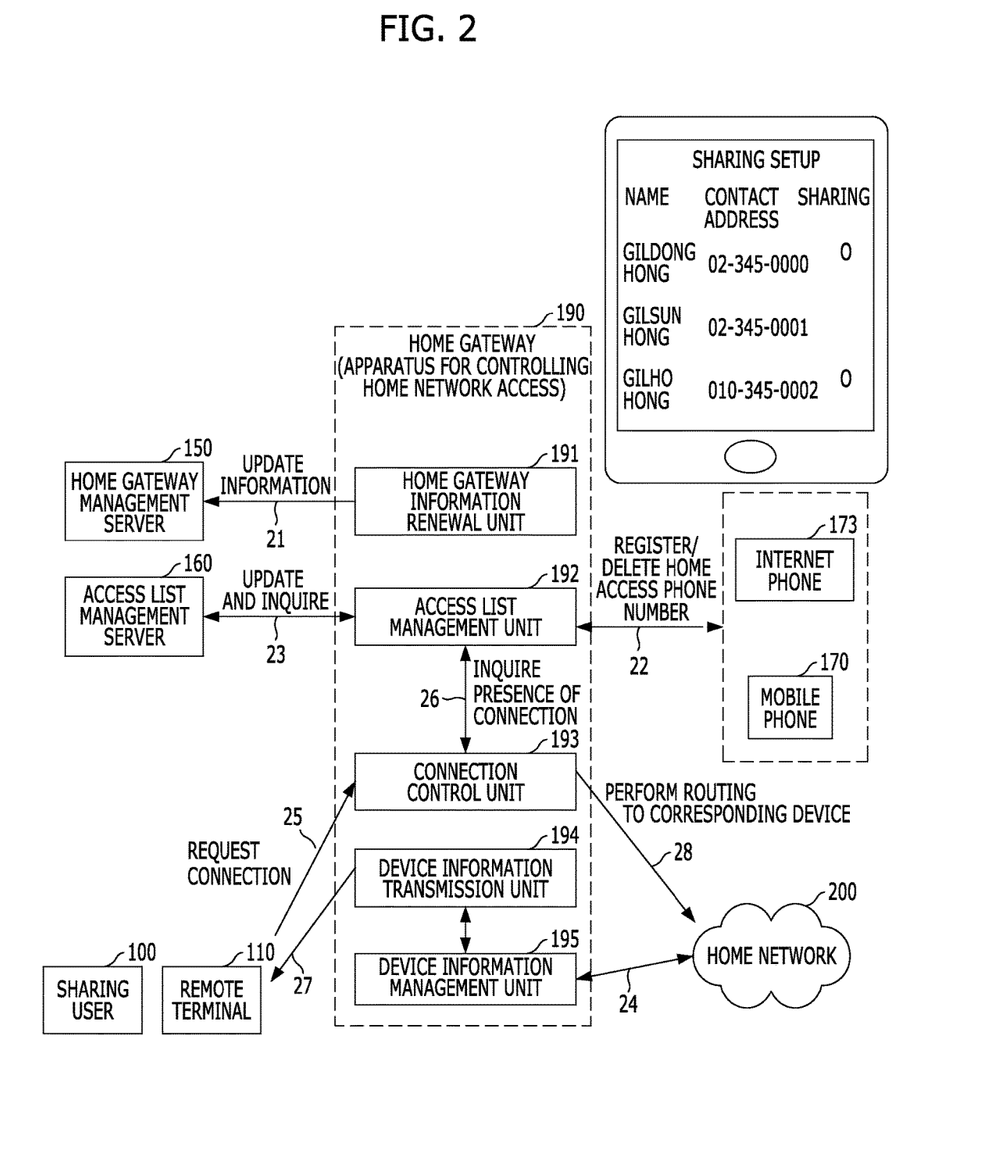
FIG. 2 illustrates an apparatus and method for controlling a home network access using phone numbers according to an exemplary embodiment.

FIG. 2 illustrates an apparatus and method for controlling a home network access using phone numbers according to an exemplary embodiment. A process of setting and managing an access list and controlling a home network access using phone numbers is illustrated in FIG. 2.

As illustrated in FIG. 2, the apparatus (home gateway 190) according to the exemplary embodiment includes a home gateway information renewal unit 191, an access list management unit 192, a connection control unit 193, a device information transmission unit 194, and a device information management unit 195. The home gateway information renewal unit 191 periodically updates state information (e.g., the presence of on-line state), access information (e.g., access IP address information), etc. in the home gateway management server 150. As a user requests the apparatus to register or delete a phone number to allow remote connection to a corresponding home or device based on a phone number list of a device (home terminal) having a telephone number, such as the Internet phone 173 or the mobile phone 170, the access list management unit 192 updates the corresponding access list in the access list management server 160. As the Internet phone 173, the mobile phone 170, the computer 172, the camera 171 and various other UPnP devices are connected to the home network 200, the device information management unit 195 registers the corresponding devices as available service terminals. That is, the device information management unit 195 registers and manages device information on the corresponding devices (home terminals). As the remote terminal 110 requests the apparatus of an access to a terminal connected to the home network 200, the connection control unit 193 identifies the presence of accessibility to the corresponding terminal through the access list management unit 192 based on authentication information (authentication key), and performs a control (blocking or routing) of the access. As the remote terminal 110 is allowed to access a home terminal, the device information transmission unit 194 searches the device information management unit 195 for device information of the corresponding home terminal, and transmits the device information to the remote terminal 110.

Next, the method for controlling a home network access using phone numbers will be described with reference to FIG. 2. First, in a case where a device (home terminal) having a phone number, such as the Internet phone 173 or the mobile phone 170, is connected to the home network 200, the home gateway 190 extracts phone number information of the corresponding device and updates the phone number information and linked home gateway identifier in the phone number management server 140.

The home gateway 190 periodically updates the presence of on-line state (state information), access IP address information (access information), etc. in the home gateway management server 150 (21).

If a user requests the apparatus to register or delete a phone number to allow remote connection to a corresponding home or device (22) based on a phone number list of a device (home terminal) having a telephone number, such as the Internet phone 173 or the mobile phone 170, the home gateway 190 updates the corresponding access list in the access list management server 106 (23).

If the home network 200 is constructed through the home gateway 190 and the Internet phone 173, the mobile phone 173, the computer 172, the camera 171 and various other UPnP devices are connected to the corresponding network 200, the home gateway 190 registers the corresponding devices as available service terminals. That is, the home gateway 190 registers and manages device information on the corresponding devices (24).

If the remote terminal 110 requests the home gateway 190 of an access to a terminal connected to the home network 200 (25), the home gateway 190 identifies the presence of accessibility based on authentication information (authentication key) (26). If the corresponding device (home terminal) is accessible, the home gateway 190 provides device information inside a corresponding home (27), and routes the request to the corresponding device (28).

Figure 3:
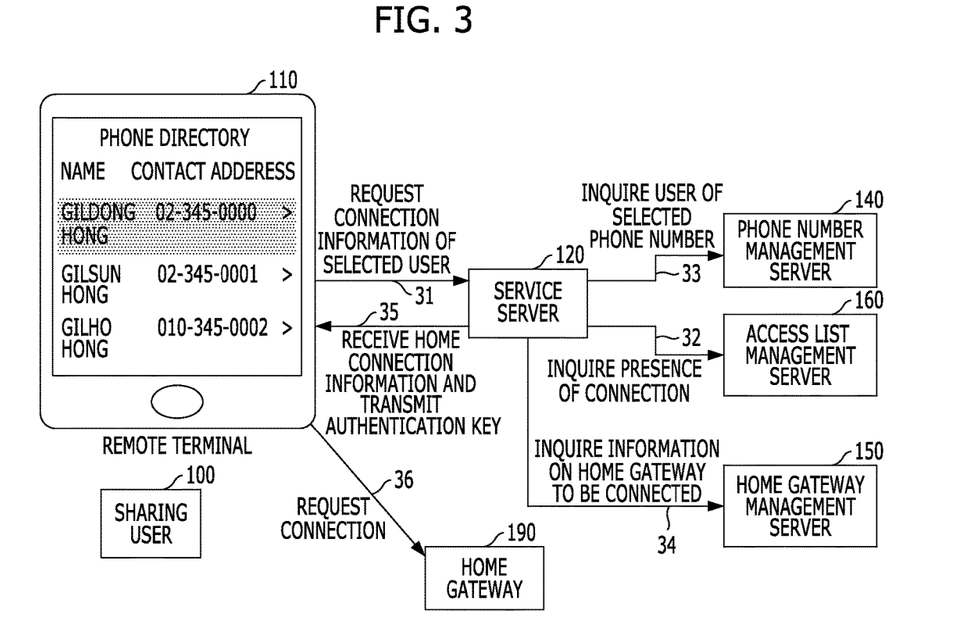
FIG. 3 illustrates a method for controlling a home network access using phone numbers according to an exemplary embodiment.

FIG. 3 illustrates a method for controlling a home network access using phone numbers according to an exemplary embodiment. A service process of the remote terminal 110 is illustrated in FIG. 3.

First, the service server 120 receives a connection request from the remote terminal 110 (31). That is, a remote user 100 located outside a home selects a phone number of the corresponding home using a phone number list of the remote terminal 110, and requests the service server 120 to provide a service.

Subsequently, the service server 120 inquires the access list management server 160 using the corresponding phone number, and identifies the presence of accessibility of the remote terminal 110 (32). That is, the service server 120 inquires the access list management server 160 to determine whether the telephone number provided by the remote terminal 110 is a telephone number that a user may use to request access to the home network 200.

The service server 120 extracts home gateway recognition information (linked home gateway identifier) connected to the corresponding phone number through the phone number management server 140 (33). That is, the service server 120 inquires the phone number management server 140 to determine the identifier of the home gateway that is associated with the phone number of the home provided by the remote terminal 110.

Subsequently, the service server 120 inquires the home gateway management server 150 of state information (the presence of driving) and connection information (i.e., IP address and information on a home gateway to be connected) of the corresponding home gateway 190 based on the extracted linked home gateway identifier (34).

Subsequently, the service server 120 transmits the information on the home gateway to be connected (the state information and access information of the corresponding home gateway) to the remote terminal 110 (35). In this case, the service server 120 also transmits authentication information (authentication key) for indicating that the remote terminal 110 is an authenticated terminal, to the remote terminal 110 (35).

If the remote terminal 110 requests the home gateway 190 of an access to a terminal connected to the home gateway 190, the home gateway 190 identifies the presence of accessibility of the remote terminal 110 based on the authentication information (authentication key). Then, the home gateway 190 provides information on a device inside the home, to which the remote terminal 110 is accessible, and routes the access request to the corresponding device (36).

Meanwhile, unlike the general wired phone terminal 180 the mobile phone 170 is a terminal having high mobility. In a case where the mobile phone 170 is connected to the home network 200 through the home gateway 190, is separately processed as shown in FIG. 4, so that when the mobile phone 170 is located inside a home of another user, the mobile phone 170 can share contents of a corresponding terminal.

Figure 4:
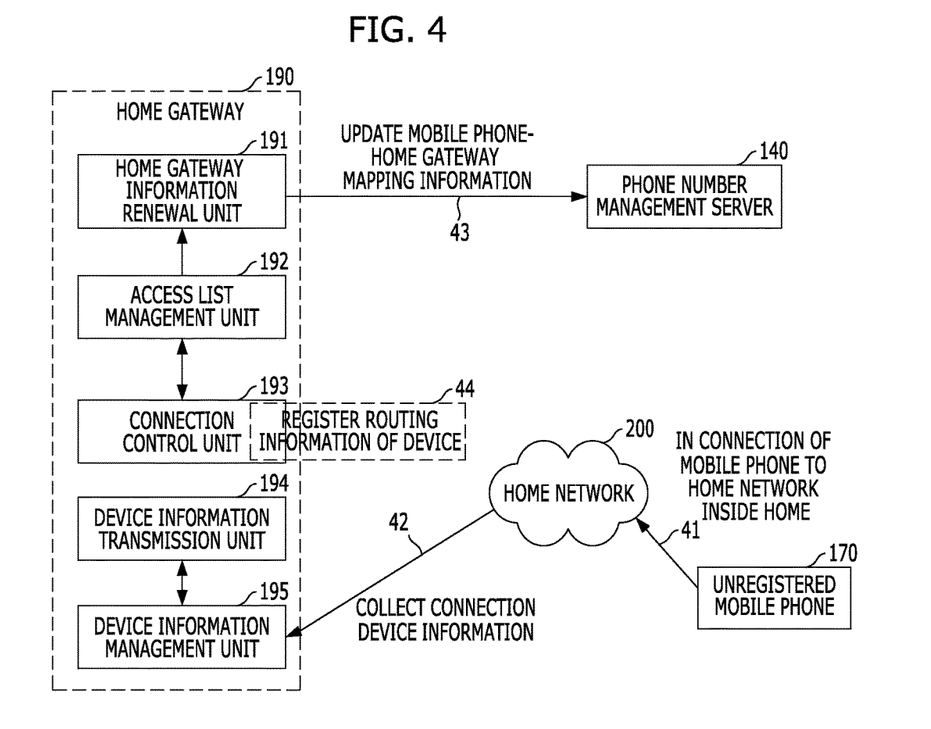
FIG. 4 illustrates a detailed processing procedure when a mobile phone is connected to a home network inside a home according to an exemplary embodiment.

FIG. 4 illustrates a detailed processing procedure when a mobile phone is connected to a home network inside a home according to an exemplary embodiment.

First, in a case where the mobile phone 170 is connected to the network 200 inside the home (41), the home gateway 190 recognizes that the mobile phone 170 is connected to the network 200 inside the home, and collects device information on the connection device (mobile phone) (42). Then, the home gateway 190 updates telephone information and a linked home gateway identifier of the corresponding mobile phone in the phone number management server 140 (43). The connection control unit 193 of the home gateway 190 registers routing information to the corresponding mobile phone 170 for preventing the remote terminal, which has requested access to the mobile phone 170, from accessing another terminal in the home network 200 (44).

In accordance with the exemplary embodiments, content sharing in a home network is extended to the outside of a home so that remote users located outside the home can easily use home contents.

Further, a sharing environment is simply set and managed based on telephone numbers capable of being easily recognized by a remote user outside the home, so that remote users can simply access shared devices inside the home using telephone numbers previously recognized by the remote users.

That is, when several sharing users located physically distant from the home network share contents of UPnP devices connected to the home network, the home contents can be easily shared using phone numbers.

Meanwhile, the above-mentioned method may be embodied as a program (computer code) executable through various computer means and recorded in a recording medium readable by a computer. In this case, the recording medium readable by a computer may include a program command, a data file, and data configuration alone or in combination. Meanwhile, the program command recorded in the recording medium may be exclusively designed and configured for the exemplary embodiments or may be known to and commonly used by those skilled in the field of computer software industry. The recording medium readable by a computer includes magnetic media such as a hard disk, a floppy disk, and a magnetic tape, optical media such as a CD-ROM and a DVD, magneto-optical media such as a floptical disk, and a hardware apparatus specially designed to store and perform a program command such as ROM, RAM, and a flash memory. Meanwhile, such a recording medium may be a transmission medium such as an optical or metal strip and waveguide including carrier wave which transmits a signal designating a program command, data configuration, and so forth. In addition, the program command includes a machine code composed by a compiler and a high-level language code executable by a computer using an interpreter.

The above-described hardware apparatuses may be configured to operate as more than one software module to perform operations of the present invention and vice versa. The hardware apparatuses of the exemplary embodiments, for example remote terminal 110, servers 120-160, gateway 190, include components commonly known to the skilled artisan, such as, but not limited to, a central control component (CPU, processor, etc). that controls operations of the device, a memory (RAM, ROM) for storing instructions executed by the control component, a bus connecting the memory, control component, and other components of the device, and various interfaces for receiving input from a user and other devices and for transmitting output to the user and other devices.

While this specification has been described with respect to the exemplary embodiments, it will be apparent to those skilled in the art that various changes and modifications may be made without departing from the spirit and scope of the features as defined in the following claims.

While this specification contains many features, the features should not be construed as limitations on the scope of the disclosure or of the appended claims. Certain features described in the context of separate exemplary embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in this description. The program components and systems may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling remote access to a home network, the method comprising:
    registering, in a telephone number management server, a plurality of telephone numbers, each telephone number being of a mobile telephone or an Internet telephone connected locally to the home network, in association with a home network gateway that controls a remote access to the home network;
    managing an access list comprising at least one first telephone number and at least one second telephone number, wherein the at least one first telephone number is registered in the telephone number management server and through which the remote access to the home network is permitted and wherein the at least one second telephone number is registered in the telephone number management server and through which the remote access to the home network is not permitted;
    receiving from a remote terminal a request to remotely access the home network through a third telephone number of a home terminal, the request comprising the third telephone number;
    determining whether the third telephone number of the received request matches the at least one first telephone number based on the access list;
    transmitting to the remote terminal an Internet Protocol (IP) address of the home network gateway in response to the determining that the third telephone number of the received request matches the at least one first telephone number;
    transmitting authentication information, which indicates that the remote terminal is an authenticated terminal, to the remote terminal in response to the determining that the third telephone number of the received request matches the at least one first telephone number;
    controlling a device connected to and within the home network using the remote terminal, which is not a part of the home network;
    extracting an identifier of the home network gateway associated with the telephone number; and
    updating state information and access information of the home network gateway.

2. The method of claim 1,
    wherein the method further comprises denying access to the home network in response to determining that the telephone number of the received request does not match the at least one first telephone number.

3. A method of controlling remote access to a home network, the method comprising:
    registering, in a telephone number management server, a plurality of telephone numbers, including a telephone number of a wire line telephone associated with a home network gateway and a telephone number of a mobile telephone or an Internet telephone connected locally to the home network;
    managing an access list comprising at least one first telephone number and at least one second telephone number, wherein the at least one first telephone number is registered in the telephone number management server and through which a remote access to the home network is permitted and wherein the at least one second telephone number is registered in the telephone number management server and through which the remote access to the home network is not permitted;
    receiving from a remote terminal a request to remotely access the home network through a third telephone number of a home terminal, the request comprising the third telephone number;
    determining whether the third telephone number of the received request matches the at least one first telephone number based on the access list;
    transmitting to the remote terminal an Internet Protocol (IP) address of the home network gateway in response to the determining that the third telephone number of the received request matches the at least one first telephone number;

transmitting authentication information, which indicates that the remote terminal is an authenticated terminal, to the remote terminal in response to the determining that the third telephone number of the received request matches the at least one first telephone number;

controlling a device connected to and within the home network using the remote terminal, the remote terminal being not a part of the home network;

extracting an identifier of the home network gateway associated with the telephone number; and updating state information and access information of the home network gateway.

4. The method of claim 1, wherein the access information of the home network gateway includes the IP address of the home network gateway.

5. The method of claim 1, further comprising:

identifying presence of the remote access of the remote terminal to the home network; and updating the telephone number and the identifier of the home network gateway based on the presence of the remote access.

6. The method of claim 3, wherein the access information of the home network gateway includes the IP address of the home network gateway.

7. The method of claim 3, further comprising:

identifying presence of the remote access of the remote terminal to the home network; and updating the telephone number and the identifier of the home network gateway based on the presence of the remote access.

* * * * *